(12) United States Patent
Berg et al.

(10) Patent No.: US 7,407,190 B2
(45) Date of Patent: Aug. 5, 2008

(54) STEERING COLUMN ASSEMBLY

(75) Inventors: Frederick J. Berg, Auburn, MI (US); Timothy J. Bennett, Kawkawlin, MI (US); Alan C. Davis, Fenton, MI (US); Richard K. Riefe, Saginaw, MI (US); Ronald H. Dybalski, Oxford, MI (US); Timothy M. Phillips, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 399 days.

(21) Appl. No.: 11/109,145

(22) Filed: Apr. 19, 2005

(65) Prior Publication Data

US 2005/0200112 A1    Sep. 15, 2005

Related U.S. Application Data

(63) Continuation-in-part of application No. 10/767,683, filed on Jan. 29, 2004, now Pat. No. 7,255,366.

(60) Provisional application No. 60/444,294, filed on Jan. 31, 2003.

(51) Int. Cl.
*B62D 1/18* (2006.01)
(52) U.S. Cl. .................................... 280/775
(58) Field of Classification Search .............. 280/775, 280/779; 74/493
See application file for complete search history.

(56) References Cited

U.S. PATENT DOCUMENTS

| | | | |
|---|---|---|---|
| 4,126,202 A | 11/1978 | Hern | 180/89 |
| 4,582,156 A | 4/1986 | Kochy et al. | 180/90 |
| 4,834,422 A | 5/1989 | Oikawa et al. | 280/751 |
| 4,896,736 A | 1/1990 | Smith | 180/89.16 |
| 4,946,192 A | 8/1990 | Kuwahara | 280/751 |
| 5,082,078 A | 1/1992 | Umeda et al. | 180/90 |
| 5,238,286 A | 8/1993 | Tanaka et al. | 296/70 |
| 5,259,646 A | 11/1993 | Snyder | 280/777 |
| 5,280,956 A | 1/1994 | Tanaka et al. | 280/777 |
| 5,623,169 A | 4/1997 | Sugimoto et al. | 307/10.1 |
| 5,669,634 A | 9/1997 | Heinzman et al. | 280/777 |
| 5,707,100 A | 1/1998 | Suyama et al. | 296/192 |
| 5,809,437 A | 9/1998 | Breed | 701/29 |
| 5,911,438 A | 6/1999 | Anspaugh et al. | 280/777 |
| 6,326,704 B1 | 12/2001 | Breed et al. | 307/9.1 |

(Continued)

*Primary Examiner*—Faye M. Fleming
(74) *Attorney, Agent, or Firm*—Michael D. Smith (57) ABSTRACT

A steering column assembly for operating a vehicle packages mechanical components and electrical devices normally found in or around the steering column of the vehicle into a single unit. An on-board processor accepts signals from the electrical devices, which may include motor actuators for steering column adjustments and/or pedal position adjustments. The on-board processor connects to a vehicle communications bus to communicate data received from the electrical devices to various systems throughout the vehicle. The on-board processor also receives data from the various systems. The steering column assembly also includes a display connected to the on-board processor. The display and on-board processor moves with the steering column as it is adjusted for telescope and/or tilt position. The operator receives information about the operation of the vehicle from the display. All components, including the on-board processor, are operatively connected to a column support, allowing the steering column assembly to be installed as a unit. Therefore, the steering column assembly installs quickly into the vehicle with a reduced chance of installation error.

24 Claims, 9 Drawing Sheets

U.S. PATENT DOCUMENTS

| | | |
|---|---|---|
| 6,419,270 B1 | 7/2002 | Boyle, III et al. ............ 280/779 |
| 6,450,532 B1 | 9/2002 | Ryne et al. ................... 280/777 |
| 6,454,302 B1 | 9/2002 | Li et al. ....................... 280/777 |
| 6,517,114 B1 | 2/2003 | Scheib et al. ................ 280/779 |
| 6,575,497 B1 | 6/2003 | Sandler et al. ............... 280/777 |
| 6,581,967 B1 | 6/2003 | Logan et al. ................. 280/779 |
| 6,591,927 B1 | 7/2003 | Honekamp et al. ............ 180/90 |
| 6,641,167 B2 | 11/2003 | Riefe et al. .................. 280/777 |
| 6,652,002 B2 | 11/2003 | Li et al. ....................... 280/777 |
| 6,857,498 B2 * | 2/2005 | Vitale et al. .................. 180/326 |
| 2002/0170761 A1 | 11/2002 | Honekamp et al. ............ 180/90 |
| 2003/0075405 A1 | 4/2003 | Manwaring et al. ......... 188/371 |
| 2003/0075912 A1 | 4/2003 | Riefe et al. .................. 280/777 |
| 2003/0075913 A1 | 4/2003 | Li et al. ....................... 280/777 |
| 2003/0226417 A1 | 12/2003 | Manwaring et al. ........... 74/492 |
| 2004/0011585 A1 * | 1/2004 | Menjak et al. ............... 180/402 |

\* cited by examiner

STEERING COLUMN ASSEMBLY

CROSS-REFERENCES TO RELATED APPLICATIONS

This patent application is a continuation-in-part of U.S. patent application Ser. No. 10/767,683, filed Jan. 29, 2004 which claims priority to provisional patent application 60/444,294 filed Jan. 31, 2003.

FIELD OF THE INVENTION

The subject invention relates to a steering column assembly for operating a vehicle.

BACKGROUND OF THE INVENTION

Steering column assemblies for operating a vehicle are well known in the art. One such steering column assembly is disclosed in U.S. Pat. No. 6,591,927 (the '927 patent) to Honekamp et al.

The steering column assembly of the '927 patent includes numerous components typically found on or around a steering column of a vehicle. These components include a steering shaft, an accelerator pedal, a brake pedal, a clutch pedal, and a turn signal switch. The components are assembled together into a steering column assembly for quick installation into the vehicle. However, one the steering column assembly is installed, each of the components must be independently connected, either by mechanical or electrical techniques, to the several systems of the vehicle to which they are associated.

There remains a need for a steering column assembly of components for operating a vehicle that installs into the vehicle very quickly with little opportunity for installation error.

SUMMARY OF THE INVENTION AND ADVANTAGES

A steering column assembly comprises a steering column having a connection for receiving a steering wheel. A column support is coupled to the steering column for mounting the steering column to a support structure of a vehicle. At least one electrical device is operatively attached to the column support for an operator to control the vehicle. The at least one electrical device may include, but is not limited to, a steering wheel sensor, an accelerator pedal sensor, a brake pedal sensor, a turn signal switch, a windshield wiper switch, a cruise control switch, an ignition switch, a radio switch, a selector switch, and a vehicle illumination switch. An on-board processor is carried by the column support for receiving and consolidating signals from the electrical devices. The on-board processor also has an electrical outlet for connection to a vehicle communications bus for sending data to and from the vehicle communications bus.

All of the components, including the processor, are operatively connected to the support for installation in the vehicle as a unit. This allows for a very quick installation into the vehicle with little opportunity for installation error, as only one electrical connection must be made, as opposed to numerous electrical connections and mechanical linkages.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
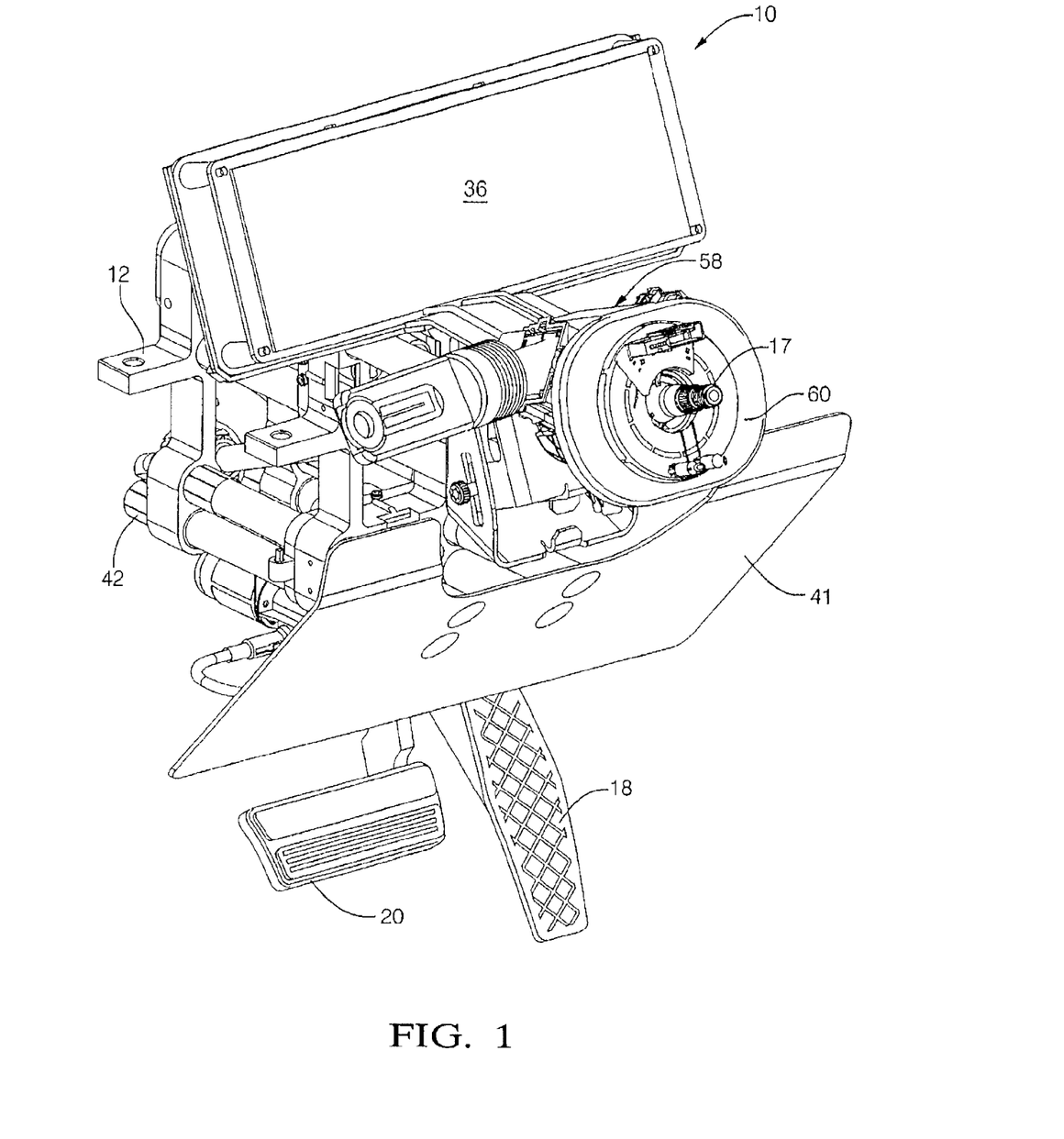
FIG. 1 is a perspective view of a steering column assembly.

Referring to the Figures, where like numerals indicate like parts throughout the several views, a steering column assembly is shown generally at 10 in FIG. 1.

Figure 2:
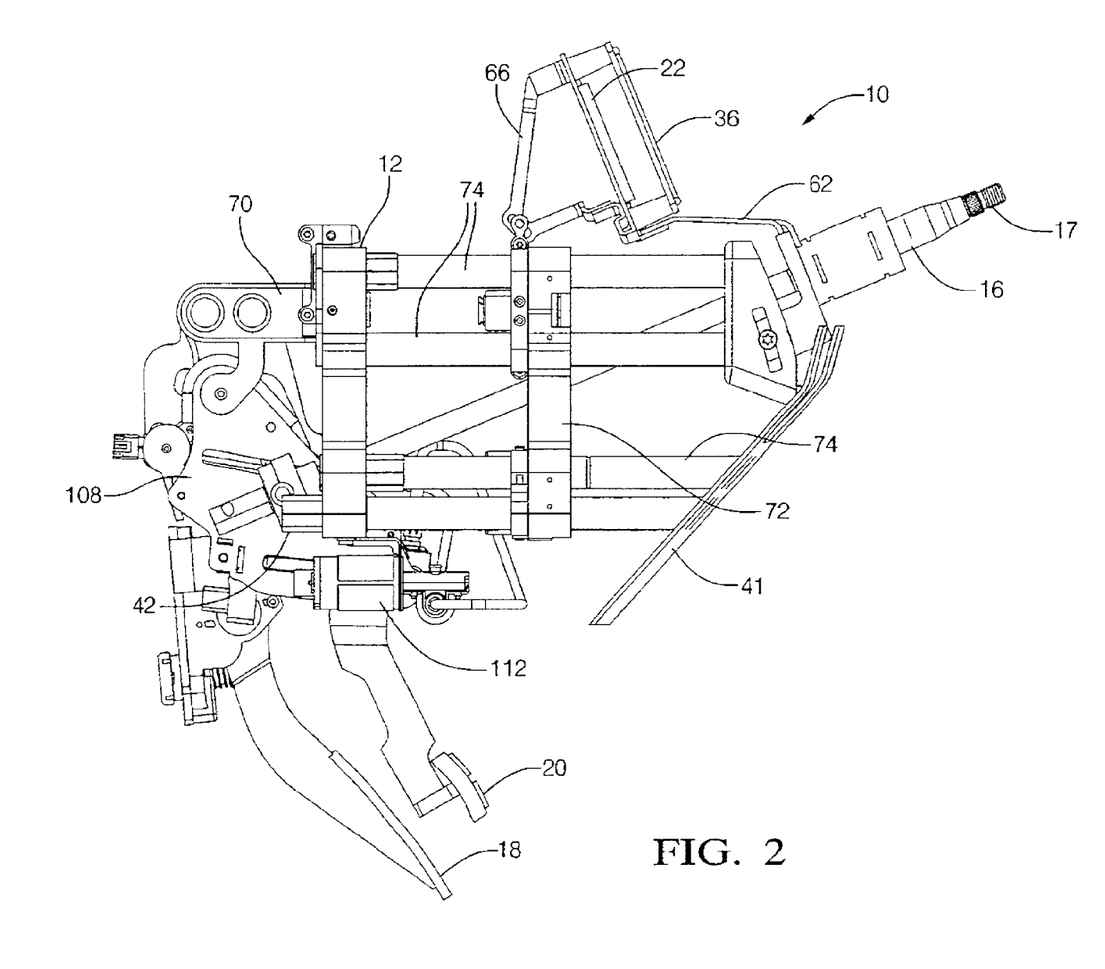
FIG. 2 is a side view of the steering column assembly.

Referring to FIG. 2, the steering column assembly 10 includes a steering column 16 with a connection 17 for receiving a steering wheel. A column support 12 is coupled to the steering column 16 for mounting the steering column 16 to the vehicle. The steering column assembly 10 is attached in an operator space of the vehicle, preferably in front of a driver's seat.

At least one electrical device 14 is operatively attached to the column support. The electrical devices 14 are used by the operator to control the vehicle and are described in more detail below.

Figure 3:
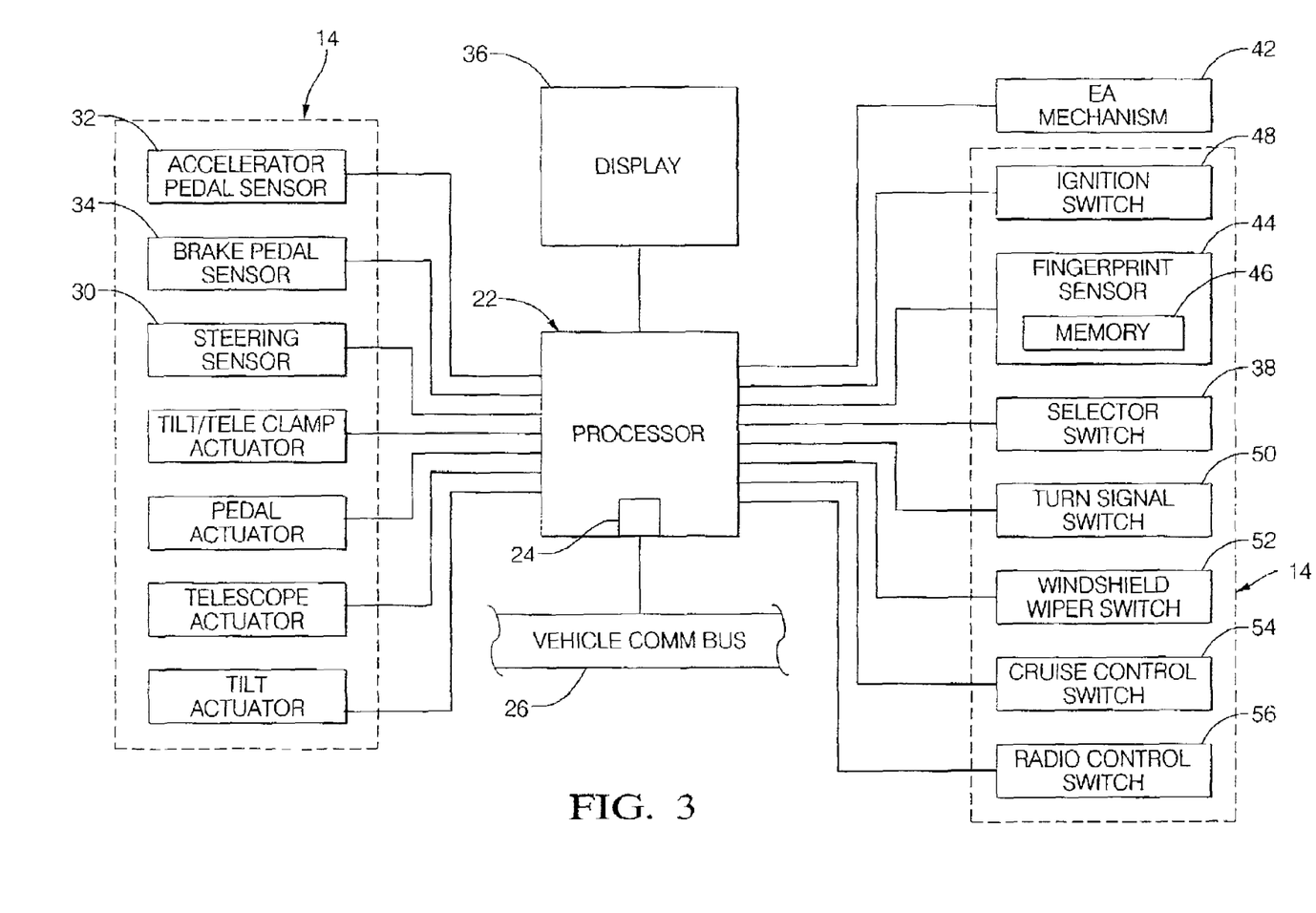
FIG. 3 is a block electrical schematic diagram of the steering column assembly.

An on-board processor 22 is carried by the column support 12. Referring now to FIG. 3, the on-board processor 22 receives and consolidates signals from the electrical devices 14. The on-board processor 22 also has an electrical outlet 24 for connecting to a vehicle communications bus 26. This connection allows the on-board processor 22 to send data to and from the vehicle communications bus 26. The vehicle communication bus 26 runs to other electronic components of the vehicle, including, but not limited to, an engine controller, a climate control module, electric brakes, a steering apparatus, a relay center, a radio, and an entertainment center.

In a preferred embodiment, an accelerator pedal 18 and a brake pedal 20 are each pivotally supported on a pedal bracket 108 below the column 16. Those skilled in the art will appreciate that the accelerator and brake pedals 18, 20 may be either of a fixed or an adjustable type. As is the typical practice, an operator depresses the accelerator pedal 18 to add fuel to an engine of the vehicle, thus causing the vehicle to move. Brakes of the vehicle are activated to slow or stop the vehicle when the operator depresses the brake pedal 20.

In the preferred embodiment, the electrical devices 14 include a steering sensor 30, an accelerator pedal sensor 32, and a brake pedal sensor 34. The steering sensor 30 senses rotational movement of the steering wheel and sends a signal corresponding to the rotational movement of the steering wheel to the on-board processor 22. The on-board processor 22 converts the signal corresponding to the rotational movement into data which is sent via the vehicle communications bus 26 to the steering apparatus. The steering apparatus then affects mechanical movement of the wheels of the vehicle.

Likewise, the accelerator pedal sensor 32 and brake pedal sensor 34 sense the respective pivotal movements of the accelerator pedal 18 and the brake pedal 20 and send corresponding signals to the on-board processor 22. The signal corresponding to the movement of the accelerator pedal 18 is sent via the vehicle communications bus 26 to the engine controller. The engine controller controls the flow of fuel to the engine. The signal corresponding to the movement of the brake pedal 20 is sent to the electric brakes via the vehicle communications bus 26.

The electrical devices 14 may also include other forms of driver controlled features, such as actuators for column adjustment, actuators for pedal position adjustment, actuators for power windows, actuator motors used in steer by wire systems and brake by wire systems, seat position adjustment motors/actuators, lumbar support adjustment motors/actuators, power door motor/actuators such as sliding van doors, trunk latch actuators, power mirror adjustment motor/actuators, HVAC motors and controls, etc. In other words, any type of actuated device, whether the actuator is a traditional electric motor, a solenoid, a hydraulic actuator, a pneumatic actuator, an electromagnetic latch device, or any other such implementation can be controlled as an electrical device 14 through the on-board processor 22.

The preferred embodiment also includes a display 36. The display 36 is electrically connected to the on-board processor 22 for displaying data relating to operation of the vehicle. This data may be received by the on-board processor 22 from the vehicle communication bus 26 or may be generated by the on-board processor 22 from the electrical devices 14 which are electrically connected to the on-board processor 22. This data includes, but is not limited to vehicle speed, engine RPM, engine oil pressure, battery voltage, climate control settings, radio settings, cruise control settings, check engine warning, navigational information, vehicle direction, and outside temperature. A selector switch 38 is electrically connected to the on-board processor 22 for changing the data presented on the display 36 and inputting data to the on-board processor 22.

The steering column assembly 10 also includes an energy absorbing (EA) mechanism 42. The EA mechanism 42 may be electrically connected to the on-board processor 22. In the event the vehicle is involved in a collision, an energy absorption load of the EA mechanism 42 is operative to absorb the impact caused when the operator of the vehicle is propelled toward the steering column assembly 10. The EA mechanism 42 may adjust the energy absorption load of the module 10 based on physical characteristics of the operator, such as height, weight, and seat position, which are received by the EA mechanism 42 from the on-board processor 22.

The physical characteristics of the operator may be obtained by the on-board processor 22 using several different methods. In the preferred embodiment, a fingerprint sensor 44, containing a memory 46, is electrically connected to the on-board processor 22. The fingerprint sensor 44 scans the fingerprint of the operator of the vehicle to determine an identification of the operator. The memory 46 keeps records of the physical characteristics of the operators of the vehicle. The operator manually enters these records of the physical characteristics via the selector switch 38 once and need not enter them from thereon. The fingerprint sensor 44 sends the record of the physical characteristics of the operator to the on-board processor 22 for adjustment of the energy absorption load of the EA mechanism 42. In a first alternative embodiment, a key fob, typically used to unlock a door of the vehicle, contains the physical characteristics of the operator. When activated, the key fob would transmit the physical characteristics to the on-board processor 22. In a second alternative embodiment, various sensors within the vehicle are used to actively determine the physical characteristics of the operator.

The steering column assembly 10 also includes a knee bolster 41 for protecting the knees of the operator in the event of an accident of the vehicle. The knee bolster 41 is supported by the column support 12 and will assist in absorbing the impact caused when the operator is propelled toward the steering column assembly 10. Particularly, the knee bolster 41 will absorb the impact of the knees of the operator.

Another electrical device 14 preferably included in the steering column assembly 10 is an ignition switch 48. The ignition switch 48 is electrically connected to the on-board processor 22 for starting the engine of the vehicle. It is further preferred that the fingerprint sensor 44 described above be an integral component of the ignition switch 48. When the operator whishes to drive the vehicle, he or she places his finger on the fingerprint sensor 44 for scanning. The engine of the vehicle would then start and the physical characteristics of the operator are used to adjust the EA mechanism 42.

A turn signal switch 50 is also one of the electrical devices 14 of the preferred embodiment. The turn signal switch 50 activates turn signals of the vehicle. When the turn signal switch 50 is activated a signal is sent to the on-board processor 22. The processor 22 will then send data to the relay center via the vehicle communications bus 26. The display 36 is instructed by the on-board processor 22 to show that the turn signal is activated.

It is further preferred that the electrical devices 14 a windshield wiper switch 52 and a cruise control switch 54, each electrically connected to the processor 22. The windshield wiper switch 52 is used to control a windshield wiper of the vehicle. The cruise control switch 54 controls a cruise control system of the vehicle. Other electrical devices 14 that may be electrically connected to the on-board processor 22 include, but are not limited to, a radio switch for controlling a radio system of the vehicle and a lighting switch for controlling exterior and interior lighting of the vehicle.

Figure 4:
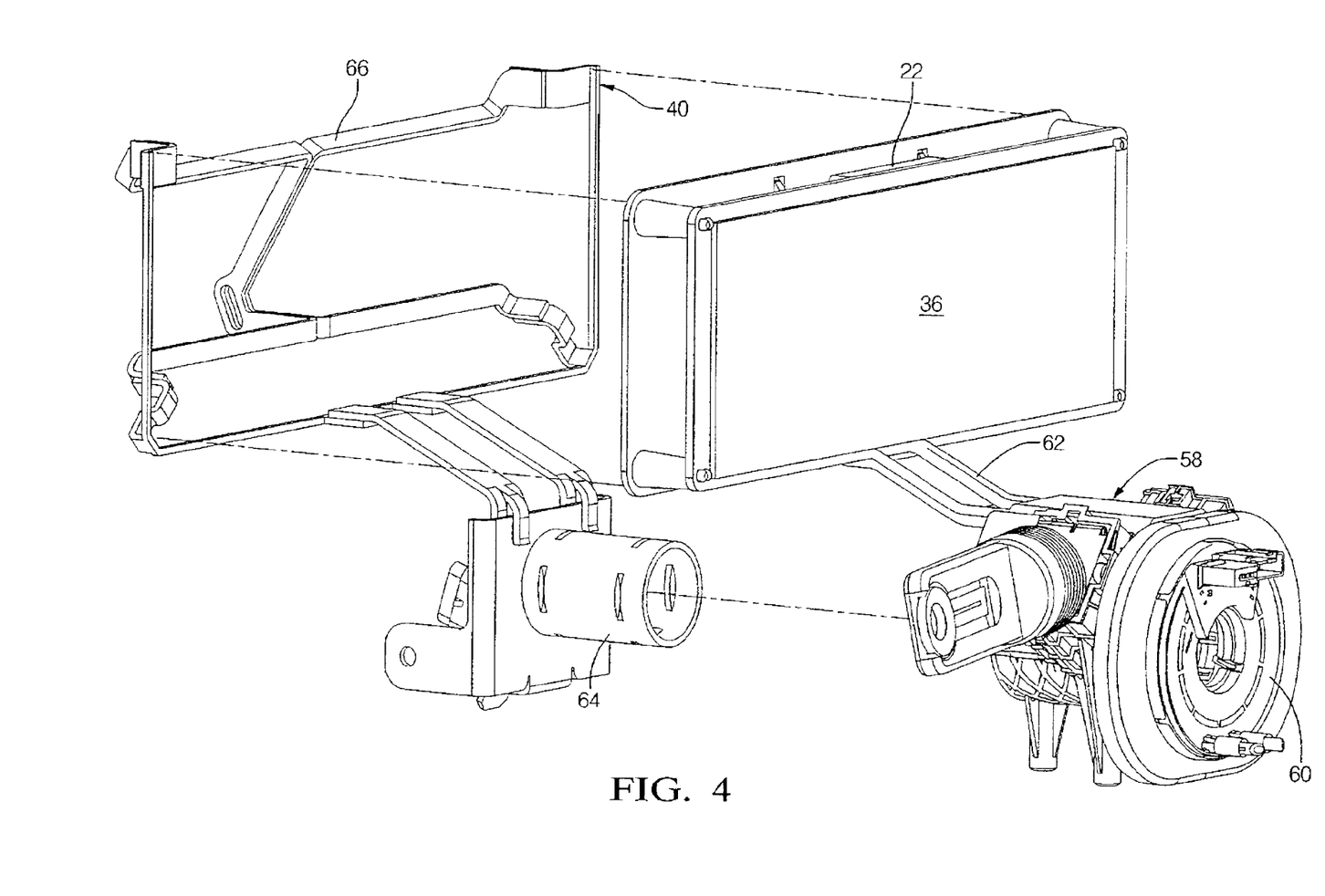
FIG. 4 is a perspective view of a cluster mechanism, a wireway, a display and an on-board processor.

In the preferred embodiment, an integrated bracket 40, as shown in FIG. 4, has a first portion 64 and a second portion 66. The integrated bracket 40 is supported by the column support. The first portion 64 supports the steering column 16. The second portion 66 supports the processor 22 and the display 36. Since the integrated bracket 40 is supported by the support column 12, vibration of the processor 22 and display 36 is significantly reduced.

Figure 5:
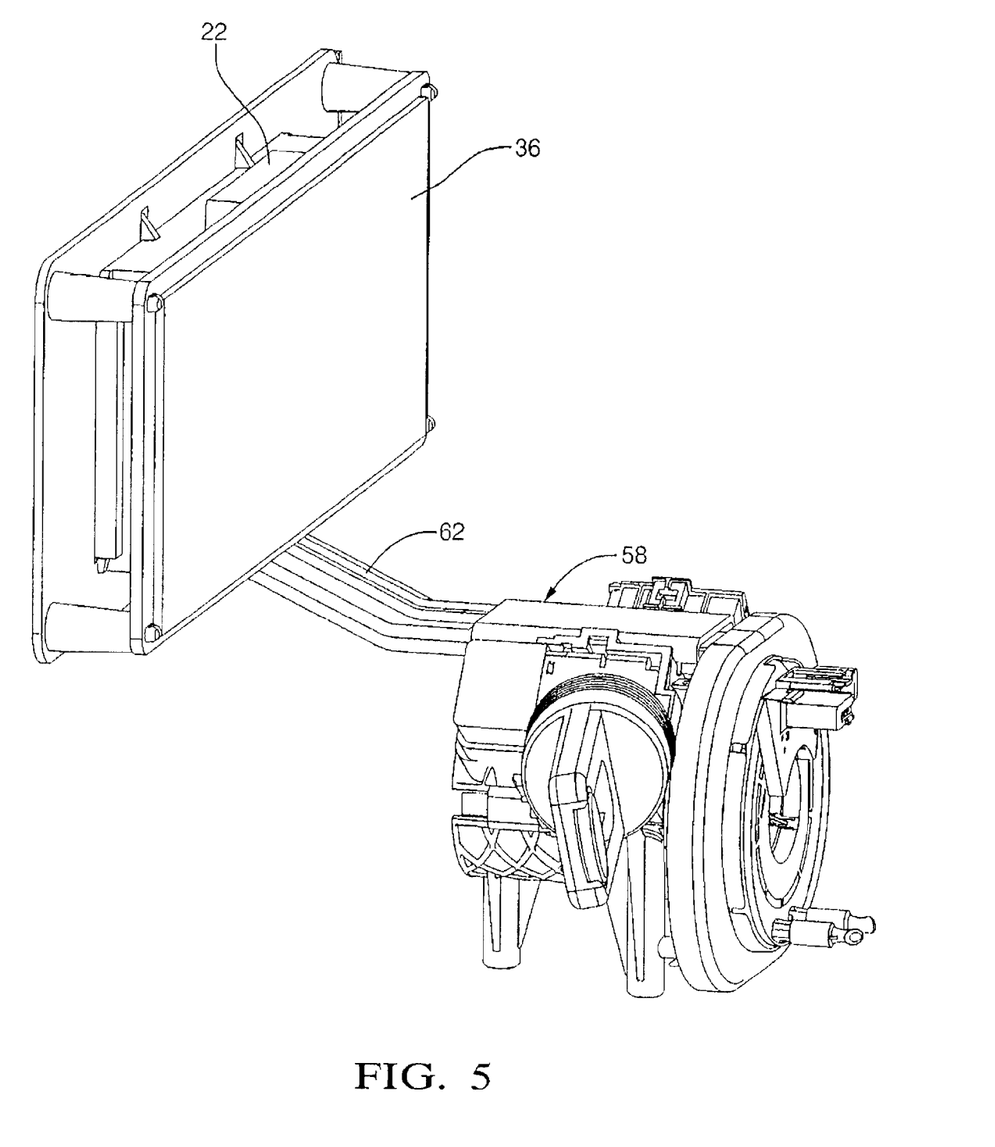
FIG. 5 is an exploded perspective view of an integrated bracket for support of a steering column, the cluster mechanism, the wireway, the display, and the on-board processor.

Referring to FIG. 5, the preferred embodiment of the steering column assembly 10 also includes a cluster mechanism 58 supported by the first portion 64 of the integrated bracket 40. The cluster mechanism 58 includes a clockspring coil 60 which provides an electrical connection between the on-board processor 22 and the steering wheel. The clockspring coil 60 is a wound bundle of wires that allows the steering wheel to turn freely while providing the electrical connection to steering wheel-mounted electrical devices 14 such as, but not limited to, a horn switch, an airbag deployment apparatus, the selector switch 38, and the radio switch. The cluster mechanism 58 also preferably supports several electrical devices 14, such as, but not limited to, the turn signal switch 50, the windshield wiper switch 52, and the cruise control switch 54. A wireway 62 electrically connects the cluster mechanism 58 to the on-board processor 22. The wireway 62 may simply support electrical conducts or, alternatively, the conductors may be embedded within the wireway 62.

The on-board processor 22 includes all components necessary to interface with the various electrical and electronic devices described herein. Such components include, but are not limited to, a microprocessor, a microcontroller, an analog-to-digital converter (ADC), a digital-to-analog converter (DAC), an application specific integrated circuit (ASIC), and a communication subprocessor.

Figure 6:
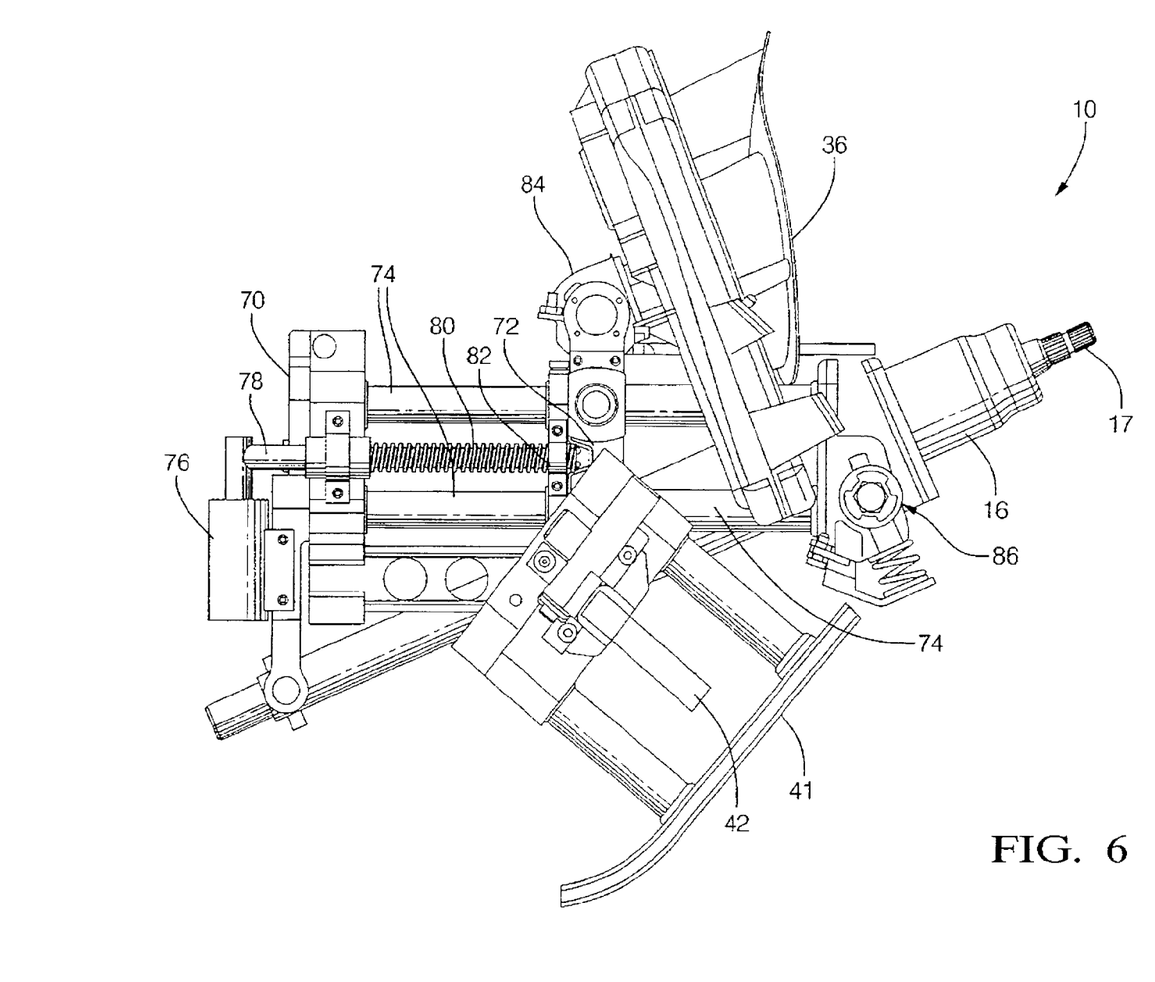
FIG. 6 is a simplified side view of an alternative embodiment of the steering column assembly including a power telescoping adjustment feature.

As shown in FIG. 2, the column support 12 may be of the type for adjustably supporting the steering column 16 so that an operator can adjust its angular and/or telescopic position for maximum comfort. In such a situation, the column support 12 may be composed of at least two components, one being a fixed mounting bracket 70, which is attached securely to the vehicle support structure (such as a firewall or dashboard framework), and a carriage housing support 72, which is movably carried on the mounting bracket 70. In the example of FIG. 2, the mounting bracket 70 includes a plurality of parallel guide tubes 74 along which the carriage housing support 72 slides. However, other mechanical configurations are possible, including the more traditional telescoping column jacket style system. The steering column 16 of FIG. 6 is joined to the carriage housing support 72 in such a manner that an operator can adjust its position in the fore-aft (i.e., reach) direction relative to the mounting bracket 70. In addition, because the integrated bracket 40 is affixed to the carriage housing support 72, the on-board processor 22 and display 36 also move in the telescoping direction with the steering column 16 when it is adjusted.

As indicated above, the electronic devices 14 may include any type of actuator for the various driver-controlled features in the vehicle. FIG. 6 illustrates one such example where a telescope actuator is employed to control the telescoping motion of the steering column 16. The telescope actuator is controlled through the on-board processor 22 (see FIG. 3), and includes a motor 76 affixed to the mounting bracket 70. A drive shaft 75 is rotatably coupled to the motor 76 and drives a power screw 80. A nut 82 is affixed to the carriage housing support 72 and threadably receives the power screw 80 so that the carriage housing support 72 is pushed or pulled along the guide tubes 74 whenever the reversible motor 76 is actuated. A suitable operator control device can be conveniently located anywhere within the vehicle enclosure, and preferably integrated into a switch mounting on the steering wheel or on the column tree. Alternatively, the telescope actuator can be of any other type known in the art, including hydraulic, pneumatic, electromagnetic, or the like. A column raking bracket 84 is carried on the carriage housing support 72 and may be either of the fixed or rake adjustable type as described below. The column 16 in this example includes a manual rake adjust mechanism, generally indicated at 86, by which the driver can temporarily unlock the column 16, adjust its rake angle, and relock for normal driving operations.

Figure 7:
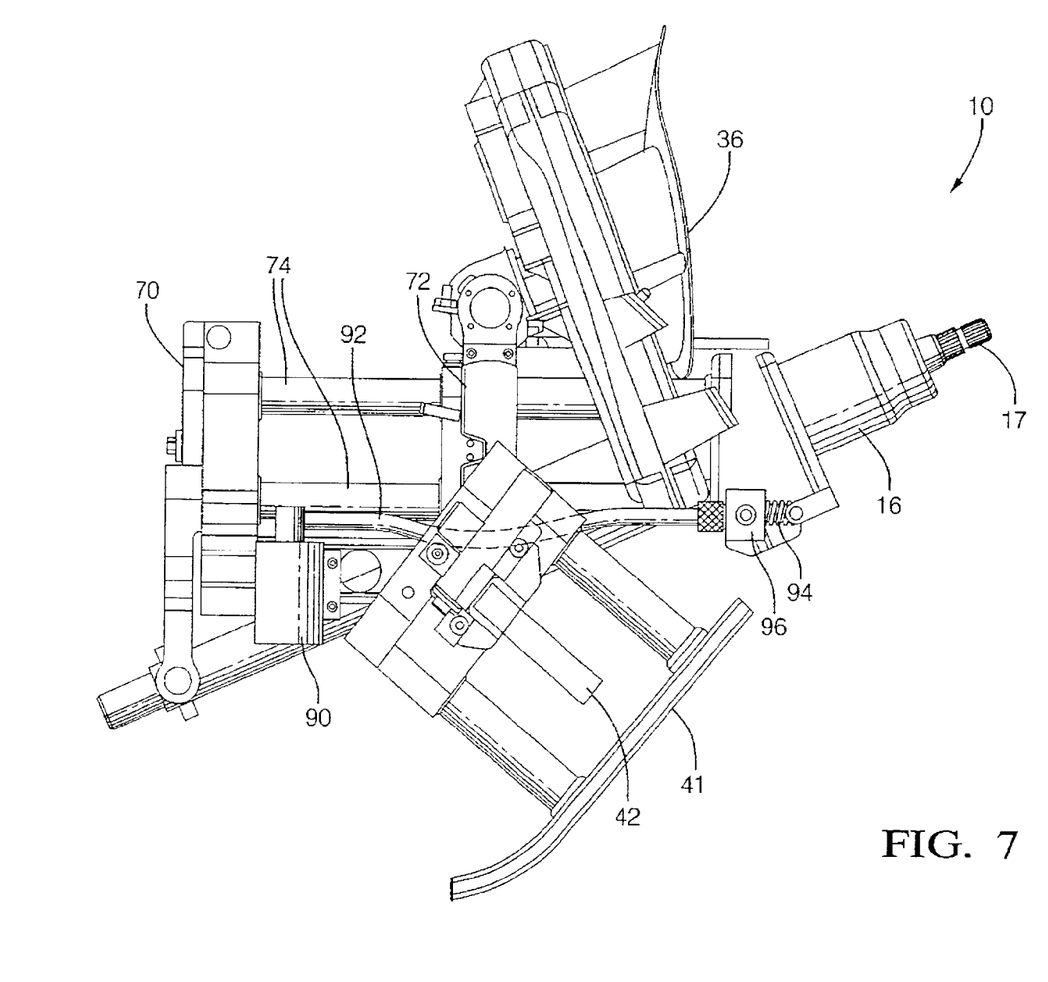
FIG. 7 is a simplified side view of another alternative embodiment of the steering column assembly including a power tilting adjustment feature.

FIG. 7 illustrates yet another alternative embodiment of the subject steering assembly in which a tilt actuator is incorporated for the purpose of providing motor driven tilt adjustments to the steering column 16. (The term "tilt" is used in its broadest sense to include all tilting, angular, and raking adjustments of the steering column 16.) More specifically, a tilting bracket 88 is provided as a feature of the column support 12. If deployed in a steering assembly which provides telescopic adjustment, the tilting bracket 88 is movably carried on the carriage housing support 72. In non-telescoping applications, the tilting bracket 88 may be supported directly on the mounting bracket 70 or on the column jacket. The tilting bracket 88 allows for angular adjustment of the steering column 16 to accommodate driver comfort and preferences.

The tilt actuator shown in FIG. 7 includes a motor 90 affixed to the mounting bracket 70. A flexible drive shaft 92 is rotatably coupled to the motor 90 and drives a power screw 94. The free end of the power screw 94 is pivotally joined to the tilting bracket 88 via a front pin, whilst the working length of power screw 94 passes through a nut 96. As the power screw 94 is rotated in reversing directions by the motor 90, the power screw 94 pushes and pulls the tilting bracket 88 via the front pin to adjust its angular position, and thus the angular position of the steering wheel. In a true tilt configuration, it may not be desirable to tilt the display 36 with the column 16. However, in a rake adjust configuration, the display 36 may move angularly with the column 16.

The motor 90 is controlled by the driver via a switch located in a convenient location. The switch would be part of the electronic devices 14 routed through the on-board processor 22. Those skilled in the art will appreciate that other screw and nut arrangements can be substituted with equal effect, as well as alternative actuator mechanisms. For example, the screw drive mechanisms can be replaced with hydraulic actuators, pneumatic actuators, motor driven linkages, electromagnetic linear actuators, and the like. Furthermore, the specific orientation and attachment points of these actuators can be relocated to maximize mechanical efficiencies, adapt to tilt versus rake adjust configurations, and for packaging considerations.

Figure 8:
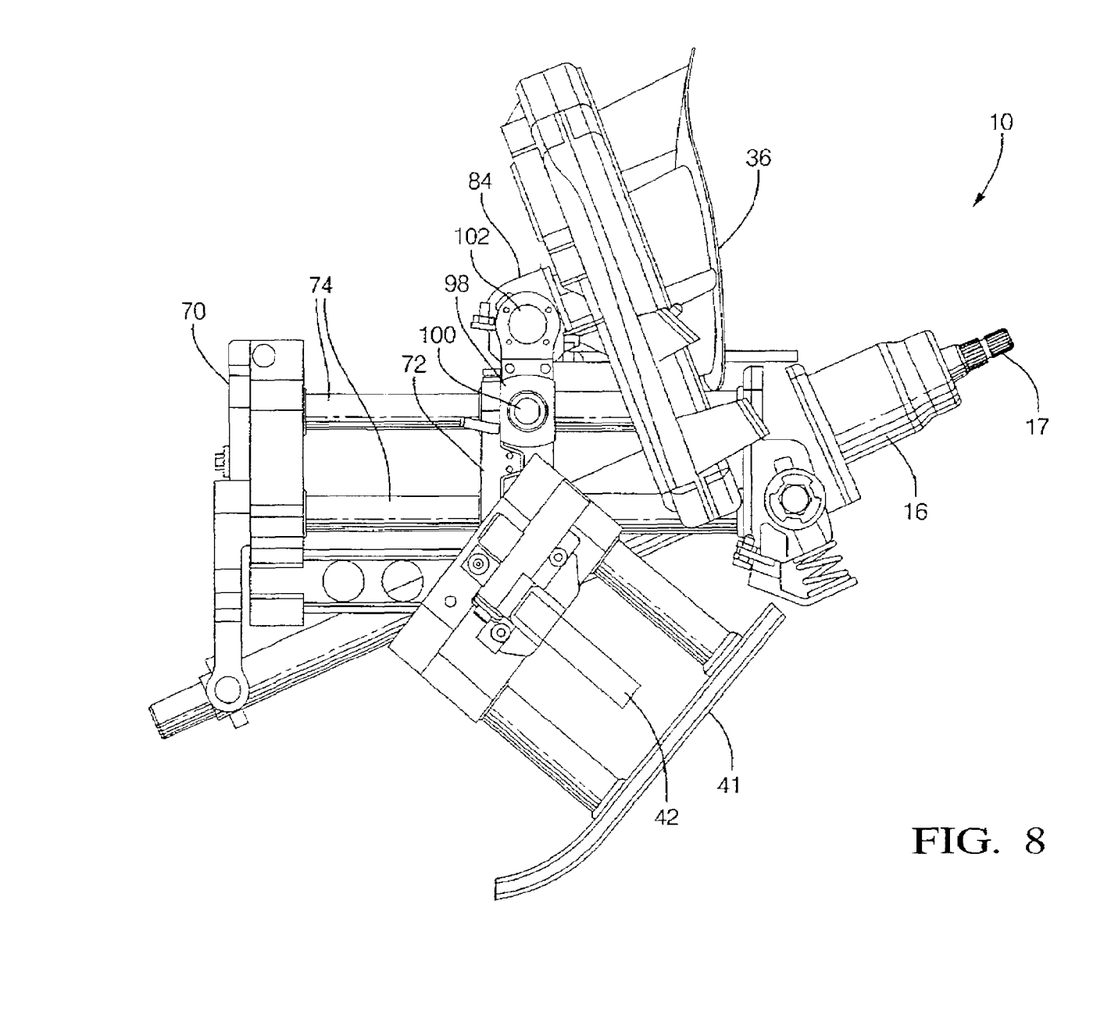
FIG. 8 is side view of yet another alternative embodiment of the steering column assembly including an electronic clamping feature for a rake adjustment mechanism.
Figure 9:
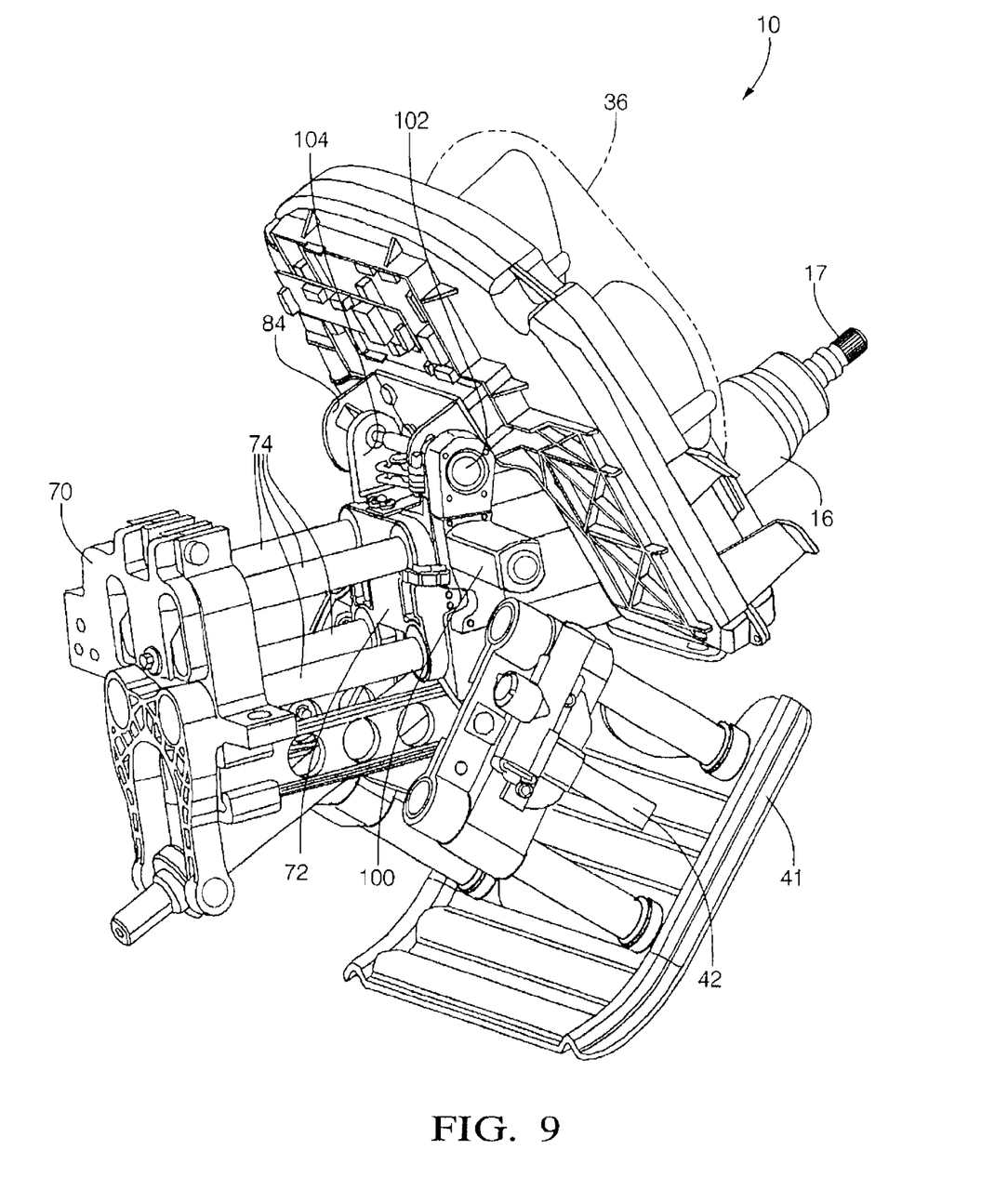
FIG. 9 is perspective view of the steering column assembly shown in FIG. 8.

Referring now to FIGS. 8 and 9, yet another alternative embodiment of the subject steering assembly 10 is shown. Here, the steering column 16 is adjustable in both the telescoping and tilt directions with manual input provided from the driver. In these examples, a tilt and telescope clamp actuator, generally indicated at 98, is carried on the carriage housing support 72. This clamp actuator 98 includes a motor 100 and a clamping mechanism 102. The clamping mechanism 102 operates to compress either side of the tilting bracket 88 against a yoke feature 104 extending from the carriage housing support 72. Such clamping arrangements can take a variety of forms. For example, the design shown in applicant's co-pending application serial no. [DP-313249; to be determined] filed on the same day as the subject application, the entire disclosure of which is hereby incorporated by reference, can be used. A switch or control selectively actuated by the driver operates through the on-board processor 22 and actuates the motor 100 to release the clamping mechanism 102 to permit manual tilt (or rake) and telescoping adjustment of the steering column 16 by the operator. Once the operator has found a desired position of the steering wheel, the motor 100 is de-energized, again acting through the on-board processor 22, to return the clamping mechanism 102 to a holdfast condition. As in previous embodiments, it is here shown that the column raking bracket 84 is carried together with the steering column 16 so that the position of the display 36 is moved angularly and telescopically at the same time as the steering column adjustment. Thus, the driver can position the steering wheel for maximum comfort and/or position the display 36 for best viewing.

Another example of an actuator controlled through the on-board processor 22 includes a pedal actuator which is illustrated in FIG. 2. Here, the brake 20 and accelerator 18 pedals are mounted on a pedal bracket 108. The pedal bracket 108 is movably affixed to the mounting bracket 70. A motor 112 acts between the pedal bracket 108 and the mounting bracket 70 via any of the described mechanisms to adjust the position of pedal bracket 108, and thus the position of the accelerator 18 and brake 20 pedals, for best driver comfort. The motor 112 may act through a screw mechanism such as described in connection with the telescope and tilt actuators of FIGS. 6 and 7, or may be of other suitable actuator type. The motor 112 is selectively controlled by the driver through a switch conveniently located and routed through the on-board processor 22. The switch may be located on the dashboard, door, console, or upon the steering column signal tree or upon the steering wheel itself.

The term "electrically connected" used throughout this application preferably defines a standard connection of conductive material to allow a flow of electrons. Alternatively, "electrically connected" can also refer to communication between devices via pulses of light over a fiber-optic cable or signals transmitted through the air, such as radio waves, infrared waves, or ultraviolet waves.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicular steering column assembly of the type including an integrated display panel, said assembly comprising:
   a steering column moveable in at least one of an angular adjustment and a telescoping adjustment and having a connection for receiving a steering wheel;
   an adjustable column support having a mounting bracket adapted to be fixed relative to a support structure of a vehicle with said adjustable column support coupled to and rotatably supporting said steering column for moveably mounting said steering column relative to the support structure of the vehicle in one of said angular adjustment and said telescoping adjustment; and
   a data display coupled to said column support and moveable with said steering column during one of said angular adjustment and said telescoping adjustment.

2. The assembly of claim 1 further including at least one electrical device operatively attached to said column support for an operator to control the vehicle, and an on-board processor carried by said column support for receiving and consolidating signals from said electrical devices and having an electrical outlet for connection to a vehicle communications bus for sending data to said data display.

3. The assembly of claim 2 further including a column raking bracket for supporting said on-board processor and said display.

4. The assembly of claim 1 wherein said column support includes a carriage housing support moveably carried on said mounting bracket for telescopically adjusting said steering column relative to said mounting bracket.

5. The assembly of claim 4 further including a column raking bracket supported by said carriage housing support for moveably supporting said on-board processor and said display relative to the support structure of the vehicle.

6. The assembly of claim 4 wherein said column support includes a tilting bracket for angularly adjusting said steering column.

7. The assembly of claim 6 further including a column raking bracket for moveably supporting said on-board processor and said display relative to said carriage housing support.

8. A steering column assembly comprising:
   a steering column moveable in at least one of an angular adjustment and a telescoping adjustment and having a connection for receiving a steering wheel;
   a column support having a mounting bracket adapted to be fixed relative to a support structure of a vehicle and coupled to and rotatably supporting said steering column for moveably mounting said steering column relative to the support structure of the vehicle in one of said angular adjustment and said telescoping adjustment;
   at least one electrical device operatively attached to said column support and including at least one actuator for an operator to control a vehicle feature; and
   an on-board processor coupled to said column support and moveable with said steering column in one of said angular adjustment and said telescoping adjustment and having an electrical outlet for connection to a vehicle communications bus for receiving and consolidating signals from said electrical devices and sending data to and from the vehicle communications bus.

9. The assembly of claim 8 wherein said column support includes a carriage housing support moveably carried on said mounting bracket for telescopically adjusting said steering column relative to said mounting bracket.

10. The assembly of claim 9 wherein said at least one actuator includes a telescopic actuator operatively disposed between said mounting bracket and said carriage housing support.

11. The assembly of claim 10 wherein said telescopic actuator includes a motor, a drive shaft rotatably coupled to said motor, a power screw, and a nut.

12. The assembly of claim 9 wherein said column support includes a tilting bracket for angularly adjusting said steering column.

13. The assembly of claim 12 wherein said at least one actuator includes a tilt actuator.

14. The assembly of claim 13 wherein said tilting actuator includes a motor, a drive shaft rotatably coupled to said motor, a power screw, and a nut.

15. The assembly of claim 13 wherein said tilting actuator includes a motor and a clamping mechanism.

16. The assembly of claim 8 wherein said column support includes a pedal bracket moveably affixed to the support structure of a vehicle, and a foot pedal assembly operatively supported on said pedal bracket.

17. The assembly of claim 16 wherein said at least one actuator includes a pedal actuator operatively connected to said pedal bracket.

18. The assembly of claim 17 wherein said pedal actuator includes a motor.

19. The assembly of claim 8 wherein said at least one actuator includes a seat position adjustment device.

20. The assembly of claim 8 wherein said at least one actuator includes a power door motor.

21. The assembly of claim 8 wherein said at least one actuator includes a power lumbar adjustment device.

22. The assembly of claim 8 wherein said at least one actuator includes a minor position adjustment device.

23. The assembly of claim 1 further comprising an integrated bracket supported by said adjustable column support and interconnecting said data display and said adjustable column support.

24. The assembly of claim 8 further comprising an integrated bracket supported by said adjustable column support and interconnecting said on-board processor and said adjustable column support.

* * * * *